United States Patent [19]

Luciani et al.

[11] Patent Number: 5,188,997

[45] Date of Patent: Feb. 23, 1993

[54] SOLID COMPONENT OF CATALYST FOR THE (CO)POLYMERIZATION OF ETHYLENE

[75] Inventors: Luciano Luciani, Ferrara; Maddalena Pondrelli, Budrio; Renzo Invernizzi, Milan; Italo Borghi, Ferrara, all of Italy

[73] Assignee: ECP Enichem Polimeri s.r.l., Milan, Italy

[21] Appl. No.: 755,063

[22] Filed: Sep. 5, 1991

[30] Foreign Application Priority Data

Sep. 7, 1990 [IT] Italy .................. 21405 A/90

[51] Int. Cl.$^5$ .................................... C08F 4/656
[52] U.S. Cl. .................................. 502/107; 502/111; 502/113; 502/119; 502/120; 526/125
[58] Field of Search ............... 502/107, 111, 113, 119, 502/120

[56] References Cited

U.S. PATENT DOCUMENTS 4,399,054 8/1983 Ferraris et al. .
4,421,674 12/1983 Invernizzi et al. ............. 502/120 X
4,467,044 8/1984 Band ................................ 502/111
4,843,049 6/1989 Invernizzi et al. .
4,843,132 6/1989 Werner et al. ................... 502/120 X

FOREIGN PATENT DOCUMENTS 0344755 12/1989 European Pat. Off. .
0358264 3/1990 European Pat. Off. .

*Primary Examiner*—Patrick P. Garvin
*Attorney, Agent, or Firm*—Oblon, Spivak, McClelland, Maier & Neustadt

[57] ABSTRACT

A solid component of a catalyst for the (co)polymerization of ethylene is composed of a silica carrier and a catalytically active part which includes titanium, magnesium, chlorine and also alkoxy groups, and is obtained: by suspending an activated silica in an ethanolic solution of magnesium chloride; by contact of the suspension with an alkoxy or halogen alkoxyde of titanium and with a silicon halide; by eliminating the ethanol from the resulting suspension in order to recover a solid matter; and by making this solid react with an aluminum alkyl chloride.

23 Claims, No Drawings

SOLID COMPONENT OF CATALYST FOR THE (CO)POLYMERIZATION OF ETHYLENE

DESCRIPTION

The present invention concerns a solid component of catalyst, the procedure for its preparation and its use in the polymerization of ethylene and the copolymerization of ethylene with alfa-olefins.

It is known that ethylene, or generally alfa-olefins, can be polymerized at low pressure with Ziegler-Natta type catalysts. These catalysts are usually composed of a compound of elements from subgroups IV to VI of the periodic table (compounds of transition metals), mixed with an organometallic compound, or hydride, of the elements in groups I to III of the periodic table.

Catalysts are also known in the art, in which the compound of transition metal is fixed to a solid carrier, either organic or inorganic, and sometimes physically and/or chemically treated. Examples of such solid carriers are the oxygenated compounds of bivalent metals (such as oxides, inorganic oxygenated salts and carboxylates) or hydroxychlorides or the chlorides of bivalent metals. According to U.S. Pat. No. 3.642.746, a carrier for catalysts is a bivalent metal halide treated with an electron donor. According to the description of U.S. Pat. No. 4.421.674, a carrier for catalysts is a solid, smooth product obtained by the spray drying of a solution of magnesium chloride in ethanol. In particular, U.S. Pat. No. 4.421.674 specifies that microspheroidal particles of a solid such as silica can be suspended in the ethanol solution of magnesium chloride, to obtain a spherical carrier for catalysts, having a nucleus composed of the microspheroidal solid and lined with a layer of activated magnesium chloride.

It has now been discovered that it is possible to obtain solid compounds of Ziegler-Natta catalysts on a carrier prepared with microspheroidal silica and a solution of magnesium chloride in ethanol, using a simple and convenient procedure which not only overcomes the difficulties and complications involved in spray drying, but also produces solid components of catalysts having a surprisingly improved catalytic activity in the (co)-polymerization of ethylene.

In accordance with this, the present invention concerns a procedure for the preparation of a solid component of catalyst for the polymerization of ethylene and the copolymerization of ethylene with alfa-olefins, composed of a carrier of silica in particles (50-90% by weight) and a catalytically active part (50-10% by weight) including titanium, magnesium, chlorine and also alkoxy groups. This procedure is characterized by the following stages:

(a) a solution of magnesium chloride in ethanol is prepared;

(b) an activated silica in particles is impregnated using the solution prepared under (a), by suspending the silica particles in the solution;

(c) at least one titanium compound chosen from alkoxides and halogen alkoxides of titanium and a silicon halide, is added to the suspension (b), with an atomic ratio between the magnesium, in the magnesium chloride, and the titanium ranging from 2.0/1 to 12.1/1 and a ratio between the silicon atoms and alkoxy groups, in the alkoxide or halogen alkoxide of titanium, ranging from 0.1/1 to 4.0/1;

(d) the ethanol is eliminated from the suspension obtained in (c), by evaporation, to recover a solid;

(e) the solid obtained in (d) is reacted with an alkyl aluminium chloride, with an atomic ratio between the chlorine atoms, in the alkyl aluminium chloride, and the alkoxy groups, in the alkoxide or halogen alkoxide of titanium, ranging from 0.5/1 to 7.0/1; and (f) the solid component of the catalyst is recovered.

A solution of magnesium chloride in ethanol is prepared in phase (a) of the procedure. For this purpose, it is preferable to use totally or almost totally anhydrous magnesium chloride, almost totally referring to a water content which is lower than approx. 5% by weight. Similarly, the ethanol is preferably anhydrous or can have a low water content which is however less than approx. 5% by weight. The dissolving of the magnesium chloride can take place at room temperature (20°-25° C.), or at higher temperatures to reach the reflux point of the ethanol at atmospheric pressure. The preferred operating temperature is approx. 60° C., with the preparation of ethanol solutions having a concentration of magnesium chloride from 1 to 15% by weight.

In phase (b) of the procedure described in the present invention, silica in particles is impregnated using the solution prepared in (a), by suspending the silica particles in the solution.

The most suitable silica for this purpose is a microspheroidal, porous silica having a particle size ranging from 10 to 100 $\mu$m, a $SiO_2$ content of >90% by weight, a surface area ranging from 250 to 400 $m^2/g$, volume of the pores ranging from 1.3 to 1.8 ml/g and average diameter of the pores ranging from 20 to 30 nm. This silica should undergo activation treatment before being impregnated, which can be carried out either by heating the silica in an inert atmosphere, at a temperature ranging from approx. 100° C. to approx. 650° C., over a period from 1 to 20 hours, or by putting the silica in contact with a organometallic compound, such as a magnesium alkyl or an aluminium alkyl, such as magnesium butyl, octyl magnesium butyl and aluminium triethyl, operating at room temperature or at higher temperatures, for example approx. 60° C. It is preferable for the silica to be activated by treatment with octyl magnesium butyl, in quantities of approx. 10-20% by weight of silica.

Impregnation is carried out by suspending from 10 to 20 parts by weight of silica for every 100 parts by volume of the ethanol solution of magnesium chloride, and contact is maintained, if necessary under slight stirring, at a temperature which is brought from room temperature (20°-25° C.) to the approximate boiling point of the ethanol, preferably to approx. 50°-65° C., over a period from 0.5 to 2.0 hours.

According to the present invention, in phase (c) of the procedure, at least one titanium compound chosen from alkoxides and halogen alkoxides of titanium and a silicon halide, is added to the suspension (b), with an atomic ratio between the magnesium, in the magnesium chloride, and the titanium, ranging from 2.0/1 to 12.0/1, and a ratio between the silicon atoms and alkoxy groups, in the alkoxide or halogen alkoxide of titanium, ranging from 0.1/1 to 4.0/1.

The titanium compounds most suited for this purpose are alkoxides and chloroalkoxides of titanium, containing from 1 to 4 carbon atoms in the alkoxide portion. Specific examples of these compounds are: titanium tetra-n-propylate, titanium tetra-n-butylate, titanium tetra-i-propylate, titanium tetra-i-butylate and the corresponding titanium mono- or di-chloroalkoxies. These alkoxies can be mixed with titanium tetrachloride, however, it is preferable to use a mixture of titanium tetrachloride and a titanium tetraalkoxide, chosen from those listed above, with a molar ratio between them of approx. ⅓.

In accordance with the present invention, a silicon halide is added to the suspension of phase (b), chosen from silicon tetrahalides and halogen silanes. Specific examples of these compounds are: silicon tetrachloride, trichlorosilane, vinyl trichlorosilane, trichloroethoxy silane, chloroethyl trichlorosilane. For this purpose, silicon tetrachloride is preferred.

In phase (c) of the procedure, it is preferable to operate with an atomic ratio between the magnesium and titanium from 3.5/1 to 8.5/1 and with a ratio between the silicon atoms and alkoxy groups ranging from 0.5/1 to 4.0/1.

According to a particular application of the present invention, a compound of zirconium or hafnium, chosen from halides, particularly tetrachlorides alkoxides and halogen alkoxides, particularly chloroalkoxides, should be added to suspension (b), in such quantities as to have an atomic ratio between the titanium and zirconium or hafnium from 0.5/1 to 2.0/1. In this way, a solid component of catalyst is obtained, which is useful in the polymerization of ethylene obtaining polymers with a wide distribution of molecular weight.

In phase (c) of the procedure, there is no specific order for the addition of the compounds of titanium, silicon and, if any, zirconium or hafnium. However this addition is carried out, the resulting suspension is kept at a temperature ranging from room temperature (20°-25° C.) to approx. 100° C., over a period of from 0.5 to 3 hours, preferably at a temperature of around 60° C., for approx. 1 hour.

In phase (d) of the procedure, the ethanol is eliminated from the suspension obtained in (c) by means of evaporation. This evaporation should be carried out by distilling the ethanol at atmospheric pressure or at a reduced pressure and finally drying the solid for 0.5 to 2 hours at a temperature of approx. 120° C., under a pressure of 5-10 mm Hg.

In phase (e) of the procedure, the solid obtained in (d) is reacted with an alkyl aluminium chloride, with an atomic ratio between the chorine atoms, in the alkyl aluminium chloride, and the alkoxy groups, of the alkoxide or halogen alkoxide of titanium, ranging from 0.5/1 to 7.0/1.

More specifically, in phase (e) the solid is suspended in an inert hydrocarbon liquid such as hexane or heptane, and is put in contact with an aluminium chloride alkyl, generally chosen from diethyl aluminium chloride, ethyl aluminium sesquichloride, diisobutyl aluminium chloride and isobutyl aluminium dichloride, dissolved in the above hydrocarbon solvent or in a different hydrocarbon solvent. The process is carried out at a temperature ranging from 10° to 100° C, for a period which, depending on the chosen operating temperature, can vary from 10 minutes to 24 hours, to obtain an atomic ratio between the chlorine and titanium in the solid ranging from 10/1 to 40/1. The preferred operating temperature is from 20° to 90° C, for a period of from 10 minutes to 1 hour, to obtain an atomic ratio between the chlorine and titanium in the solid of from 12/1 to 36/1. This treatment has the effect of increasing the chlorine content in the solid component of catalyst, with a contemporary reduction, either partial or total, of the titanium from the tetravalent state to the trivalent state, and with the partial or total elimination of the alkoxy groups present.

At the end of the treatment, the solid component of catalyst is recovered in phase (f), is washed with a liquid aliphatic hydrocarbon solvent, such as hexane or heptane, until the chlorides have been eliminated from the washing liquid, and finally dried.

The solid component of catalyst, according to the present invention, is composed of a silica carrier in particles (50-90% by weight) and a catalytically active part (50-10% by weight) including titanium, magnesium and chorine, and also alkoxy groups, with the following atomic ratios: Mg/Ti from 2.0/1 to 12.0/1; Cl/Ti from 10/1 to 40/1, alkoxy groups/Ti from 0/1 to 20/1. These alkoxy groups include ethoxy groups originating from the ethanol and alkoxy groups deriving from the titanium alkoxide used. The quantity of titanium in the component of catalyst generally varies from 0.5 to 5.0% by weight. The solid component of catalyst is preferable composed of a silica carrier in particles (55-80% by weight) and a catalytically active part 45-20% by weight) containing titanium, magnesium, chlorine and alkoxy groups, with the following atomic ratios: Mg/Ti from 3.5/1 to 8.5/1; Cl/Ti from 12/1 to 36/1, alkoxy groups/Ti from 2/1 to 10/1. In this component of catalysts the quantity of titanium generally varies from 0.8 to 2.0% by weight.

When zirconium or hafnium is present in the solid component of catalysts, the atomic ratio between the titanium and zirconium or hafnium will range from 0.5/1 to 2.0/1.

The present invention also concerns a catalyst for the (co)polymerization of ethylene, composed of the above-mentioned solid component of catalysts, combined with an organometallic compound of aluminium (co-catalyst) chosen from aluminium trialkyls and aluminium alkyl halides (particularly chlorides), containing from 1 to 5 carbon atoms in the alkyl section. Among these, aluminium trialkyls are preferred with from 2 to 4 carbon atoms in the alkyl section, such as aluminium triethyl, aluminium tributyl and aluminium triisobutyl. The catalyst of the present invention has an atomic ratio between the aluminium (in the co-catalyst) and titanium (in the solid component of catalysts) which generally ranges from 20:1 to 250:1, preferably from 100:1 to 200:1.

This catalyst is extremely active in procedures for the polymerization of ethylene and the copolymerization of ethylene with alfa-olefins. The use of silicon halide, under the conditions described above, is essential for obtaining this activity, as can be seen from the experimental examples which follow. In particular, it has been proved that silicon halide makes solid components of catalysts highly active even when there is a high content of alkoxy groups and also in the case of solid components of catalysts containing zirconium or hafnium in addition to titanium.

The catalyst of the present invention can be used in polymerization processes carried out by means of the suspension technique in an inert diluent or using the method of the gas phase, in a fluidized or stirred bed. The alfa-olefins which can be copolymerized are generally those containing from 3 to 10 carbon atoms, preferably from 4 to 6 carbon atoms, such as butene-1, hexene-1 and 4-methyl-pentene-1. The general polymerization conditions are: temperature from 50° to 100° C, total pressure from 5 to 40 bar, with a ratio between the partial pressures of hydrogen and ethylene of from 0 to 10. There is, at any rate, high productivity in the olefinic polymer and the polymer thus obtained has an excellent rheological properties and, in particular, is in the form of granules which are non-friable and without fines.

In the experimental examples which follow and which are intended to provide a better illustration of the present invention, a microspheroidal silica carrier is used, having a particle size ranging from 20 to 60 μm, a $SiO_2$ content of >99% by weight, surface area of 320 m$^2$/g, pore volume of 1.65 ml/g and average pore diameter of 25-26 nm.

EXAMPLE 1

(comparison)

4.5 g (47.3 mmoles) of anhydrous magnesium chloride and 100 ml of absolute ethanol anhydrified on aluminium are charged into a 250 ml flask equipped with a reflux coolant, mechanical stirrer and thermometer. The mixture is heated to 60° C. for 30 minutes to allow for the complete dissolution of the magnesium chloride.

15 g of microspheroidal silica, previously activated by contact for 30 minutes at 60° C. with a solution containing 17 ml of 20% by weight of octyl magnesium butyl in heptane and 150 ml of n-hexane, are suspended in the solution thus obtained. The suspension is kept at a temperature of 60° C. for 30 minutes.

2.4 g (7.05 mmoles) of titanium tetrabutylate and 0.445 g (2.35 mmoles) of titanium tetrachloride are added to the suspension and contact is maintained at 60° C. for 1 hour.

It is then dried by evaporating the solvent and the solid recovered is heated under vacuum (5-10 mm Hg) at a temperature of 120° C. for 1 hour.

12 g of the solid thus obtained are suspended in 40 ml of anhydrous n-hexane and 9.6 ml of a 40% by weight solution of aluminium ethyl sesquichloride (3.23 g; 13.03 mmoles) in n-decane, are added to the resulting suspension. Contact is maintained for 15 minutes at a temperature of 25° C. The solid is then recovered by filtration, washed with anhydrous n-hexane until all the chlorides in the washing liquid have been eliminated, and finally dried by evaporating the solvent.

Approx. 10 g of a solid component of catalyst are thus obtained, in solid granule form, containing 58% by weight of silica and having a ratio Mg:Ti:Cl:alkoxy groups of 7.2:1.0:16.6:9.4.

The solid component of catalyst prepared in the above way, is used in a test for the polymerization of ethylene. More specifically, the polymerization is carried out in a 5 liter autoclave containing 2 liters of n-hexane. The process is carried out at a pressure of 15 bar, in the presence of hydrogen, with a ratio between the pressure of the hydrogen and that of the ethylene of 0.47/1, at a temperature of 90° C. and over a period of 2 hours, using 100 mg of the solid component of catalyst and aluminium triethyl as a co-catalyst, with an atomic ratio between the aluminium in the co-catalyst, and the titanium in the solid component of catalysts, of 190/1.

A yield equal to 2.4 kg of polyethylene per gram of the solid component of catalyst is thus obtained and the polyethylene has the following characteristics:

| | |
|---|---|
| density: (ASTM D-1505) | 0.9595 g/ml |
| MFI (2.16 kg): | 1.38 g/10' |
| (Melt-Flow Index -ASTM D-1238) apparent density: (ASTM D-1895) | 0.315 g/ml |
| MFR: | 30.0 |

(MFR = Melt-Flow Index Ratio, defined as a ratio MFI (21.6 kg)/MFI (2.16 kg)).

The polyethylene is in granule form with the following size distribution in um:

| | |
|---|---|
| >2000 | 0.1 |
| 2000< >1000 | 6.9 |
| 1000< >500 | 77.0 |
| 500< >250 | 14.0 |
| <250 | 2.0 |

EXAMPLE 2

Comparison 4.5 g (47.3 mmoles) of anhydrous magnesium chloride and 100 ml of absolute ethanl anhydrified on aluminium, are charged in a nitrogen atmosphere into a 250 ml flask equipped with a reflux coolant, mechanical stirrer and thermometer. The mixture is heated to 60° C. for 30 minutes to allow for the complete dissolution of the magnesium chloride.

15 g of microspheroidal silica, previously activated by contact for 30 minutes at 60° C. with a solution containing 17 ml of 20% by weight butyl octyl magnesium in heptane and 150 ml of n-hexane, are suspended in the solution thus obtained. The suspensione is kept at a temperature of 60° C. for 30 minutes.

2.4 g (7.05 mmoles) of titanium tetrabutylate and 0.445 g (2.35 mmoles) of titanium tetrachloride are then added to the suspension and contact is maintained at 60° C. for 1 hour.

It is then dried by evaporating the solvent and a solid is recovered, which is heated under vacuum (5-10 mm Hg) to a temperature of 120° C. for 1 hour.

12 g of the solid thus obtained are suspended in 40 ml of anhydrous n-hexane and 19.2 ml of a 40% by weight solution of aluminium ethyl sesquichloride in n-decane (6.45 g; 26.06 mmoles) are added to the resulting suspension. Contact is maintained for 1 hour at a temperature of 65° C. The solid is then recovered by filtration, washed with anhydrous n-hexane until all the chlorides in the washing liquid have been eliminated, and finally dried by evaporation of the solvent.

Approx. 10 g of a solid component of catalysts are thus obtained, in solid granule form, containing 56% by weight of silica and having a ratio Mg:Ti:Cl:alkoxy groups of 6.3:1.0:18.9:6.0.

The solid component of catalyst prepared in the above way, is used in a test for the polymerization of ethylene. More specifically, the polymerization is carried out in a 5 liter autoclave containing 2 liters of n-hexane. The process is carried out at a pressure of 15 bar, in the presence of hydrogen, with a ratio between the pressure of the hydrogen and that of the ethylene of 0.47/1, at a temperature of 90° C. over a period of 2 hours, using 100 mg of the solid component of catalysts and aluminium triethyl as a co-catalyst, with an atomic ratio between the aluminium, in the co-catalyst, and the titanium, in the solid component of catalyst, of 180/1.

A yield equal to 4.2 kg of polyethylene per gram of the solid component of catalyst, is obtained and the polyethylene has the following characteristics:

| | |
|---|---|
| density: | 0.9606 g/ml |
| MFI (2.16 kg): | 2.16 g/10' |
| apparent density: | 0.30 g/ml |
| MFR: | 31 |

The polyethylene is in granule form with the following size distribution in um:

| | |
|---|---|
| >2000 | 8.4 |
| 2000< >1000 | 19.9 |
| 1000< >500 | 63.7 |
| 500< >250 | 6.9 |
| <250 | 1.1 |

EXAMPLE 3

4.5 g (47.3 mmoles) of anhydrous magnesium chloride and 100 ml of absolute ethanol anhydrified on aluminium are charged in a nitrogen atmosphere into a 250 ml flask equipped with a reflux coolant, mechanical stirrer and thermometer. The mixture is heated to 60° C. for 30 minutes to allow for the complete dissolution of the magnesium chloride.

15 g of microspheroidal silica, previously activated by contact for 30 minutes, at 60° C., with a solution containing 17 ml of 20% by weight butyl octyl magnesium in heptane and 150 ml of n-hexane, are suspended in the solution thus obtained. The suspension is kept at a temperature of 60° C. for 30 minutes.

2.4 g (7.05 mmoles) of titanium tetrabutylate, 0.445 g (2.35 mmoles) of titanium tetrachloride, 3.3 ml (4.84 g, 28.52 mmoles) of silicon tetrachloride, are then added to the suspension and contact is maintained at 60° C. for 1 hour.

It is then dried by evaporating the solvent and a solid is recovered, which is heated under vacuum (5–10 mm Hg) to a temperature of 120° C. for 1 hour.

13.5 g of the solid thus obtained are suspended in 50 ml of anhydrous n-hexane and 12.7 ml of a 40% by weight solution of aluminium ethyl sesquichloride in n-decane (4.03 g; 16.29 mmoles), are added to the resulting suspension. Contact is maintained for 15 minutes at a temperature of 25° C. The solid is then recovered by filtration, washed with anhydrous n-hexane until all the chlorides in the washing liquid have been eliminated, and finally dried by evaporation of the solvent.

12 g of a solid component of catalyst are thus obtained, in solid granule form, containing 62% by weight of silica and having a ratio Mg:Ti:Cl:alkoxy groups of 7.2:1.0:18.9:5.4.

The solid component of catalyst prepared in the above way, is used in a test for the polymerization of ethylene. More specifically, the polymerization is carried out in a 5 liter autoclave containing 2 liters of n-hexane. The process is carried out at a pressure of 15 bar, in the presence of hydrogen, with a ratio between the pressure of the hydrogen and that of the ethylene of 0.47/1, at a temperature of 90° C., over a period of 2 hours, using 50 mg of the solid component of catalyst and aluminium triethyl as a co-catalyst, with an atomic ratio between the aluminium, in the co-catalyst, and the titanium, in the solid component of catalysts, equal to 200/1.

A yield equal to 10.4 kg of polyethylene per gram of the solid component of catalyst, is obtained and the polyethylene has the following characteristics:

| | |
|---|---|
| density: | 0.9589 g/ml |
| MFI (2.16 kg): | 2.2 g/10' |
| apparent density: | 0.28 g/ml |
| MFR: | 29.9 |

The polyethylene is in granule form with the following size distribution in um:

| | |
|---|---|
| >2000 | 4.1 |
| 2000< >1000 | 31.2 |
| 1000< >500 | 52.2 |
| 500< >250 | 8.1 |
| <250 | 4.4 |

EXAMPLE 4

Comparison 4.5 g (47.3 mmoles) of anhydrous magnesium chloride and 100 ml of absolute ethanol anhydrified on aluminium are charged in a nitrogen atmosphere into a 250 ml flask equipped with a reflux coolant, mechanical stirrer and thermometer. The mixture is heated to 60° C. for 30 minutes to allow for the complete dissolution of the magnesium chloride.

15 g of microspheroidal silica, previously activated by contact for 30 minutes, at 60° C., with a solution containing 17 ml of 20% by weight butyl octyl magnesium in heptane and 150 ml of n-hexane, are suspended in the solution thus obtained. The suspension is kept at a temperature of 60° C. for 30 minutes.

3.20 g (9.40 mmoles) of titanium tetrabutylate, 3.60 g (9.38 mmoles) of zirconium tetrabutylate, are then added to the suspension and contact is maintained at 60° C. for 1 hour.

It is then dried by evaporating the solvent and a solid is recovered, which is heated under vacuum (5–10 mm Hg) to a temperature of 120° C. for 1 hour.

11 g of the solid thus obtained are suspended in 100 ml of anhydrous n-hexane and 30 ml of a 40.5% by weight solution of aluminium isobuthyl dichloride in n-hexane (9.72 g; 62.7 mmoles), are added to the resulting suspension. Contact is maintained for hour at a temperature of 65° C. The solid is then recovered by filtration, washed with anhydrous n-hexane until all the chlorides in the washing liquid have been eliminated, and finally dried by evaporation of the solvent.

10 g of a solid component of catalyst are thus obtained, in solid granule form, containing 53.5% by weight of silica and having a ratio Mg:Ti:Zr:Cl:alkoxy groups of 6.5:1.0:1.0:24.8:4.1.

The solid component of catalyst prepared in the above way, is used in a test for the polymerization of ethylene. More specifically, the polymerization is carried out in a 5 liter autoclave containing 2 liters of n-hexane. The process is carried out at a pressure of 15 bar, in the presence of hydrogen, with a ratio between the pressure of the hydrogen and that of the ethylene of 0.47/1, at a temperature of 90° C., over a period of 2 hours, using 150 mg of the solid component of catalyst and aluminium triethyl as a co-catalyst, with an atomic ratio between the aluminium, in the co-catalyst, and the titanium, in the solid component of catalyst, equal to 140/1.

A yield equal to 4.1 kg of polyethylene per gram of the solid component of catalyst, is obtained and the polyethylene has the following characteristics:

| | |
|---|---|
| density: | 0.9636 g/ml |
| MFI (2.16 kg): | 2.9 g/10' |
| apparent density: | 0.30 g/ml |
| MFR: | 37.8 |

The polyethylene is in granule form with the following size distribution in um:

| | |
|---|---|
| >2000 | 0.1 |
| 2000< >1000 | 26.7 |
| 1000< >500 | 64.7 |
| 500< >250 | 7.4 |
| <250 | 1.1 |

EXAMPLE 5

4.5 g (47.3 mmoles) of anhydrous magnesium chloride and 100 ml of absolute ethanol anhydrified on aluminium are charged in a nitrogen atmosphere into a 250 ml flask equipped with a reflux coolant, mechanical stirrer and thermometer. The mixture is heated to 60° C. for 30 minutes to allow for the complete dissolution of the magnesium chloride.

15 g of microspheroidal silica, previously activated by contact for 30 minutes, at 60° C., with a solution containing 17 ml of 20% by weight butyl octyl magnesium in heptane and 150 ml of n-hexane, are suspended in the solution thus obtained. The suspension is kept at a temperature of 60° C. for 30 minutes.

3.20 g (9.40 mmoles) of titanium tetrabutylate 3.60 g (9.38 mmoles) of zirconium tetrabutylate, and 8.0 ml (11.74 g, 69.13 ml) of silicon tetrachloride, are then added to the suspension and contact is maintained at 60° C. for 1 hour.

. It is then dried by evaporating the solvent and a solid is recovered, which is heated under vacuum (5–10 mm Hg) to a temperature of 120° C. for 1 hour.

18.6 g of the solid thus obtained are suspended in 100 ml of anhydrous n-hexane and 37 ml of a 40.5% by weight solution of aluminium isobuthyl dichloride in n-hexane (11.9 g; 77.34 mmoles), are added to the resulting suspension. Contact is maintained for 1 hour at a temperature of 65° C. The solid is then recovered by filtration, washed with anhydrous n-hexane until all the chlorides in the washing liquid have been eliminated, and finally dried by evaporation of the solvent.

Approx. 17 g of a solid component of catalyst are thus obtained, in solid granule form, containing 50% by weight of silica and having a ratio Mg:Ti:Zr:Cl:alkoxy groups of 8.2:1.0:1.0:36.2:17.1.

The solid component of catalyst prepared in the above way, is used in a test for the polymerization of ethylene. More specifically, the polymerization is carried out in a 5 liter autoclave containing 2 liters of n-hexane. The process is carried out at a pressure of 15 bar , in the presence of hydrogen, with a ratio between the pressure of the hydrogen and that of the ethylene of 0.47/1 at a temperature of 90° C., over a period of 2 hours, using 50 mg of the solid component of catalyst and aluminium triethyl as a co-catalyst, with an atomic ratio between the aluminium, in the co-catalyst, and the titanium, in the solid component of catalyst, equal to 200/1.

A yield equal to 11 kg of polyethylene per gram of the solid component of catalyst, is obtained and the polyethylene has the following characteristics:

| | |
|---|---|
| density: | 0.9591 g/ml |
| MFI (2.16 kg): | 1.22 g/10' |
| apparent density: | 0.23 g/ml |
| MFR: | 35.1 |

The polyethylene is in granule form with the following size distribution in um:

| | |
|---|---|
| >2000 | 6.6 |
| 2000< >1000 | 40.0 |
| 1000< >500 | 42.7 |
| 500< >250 | 8.4 |
| <250 | 2.3 |

What is claimed is:

1. A proccess for the preparation of a solid component of a catalyst for the polymerization of ethylene and the copolymerization of ethylene with alfa-olefins, composed of 50–90% by wt. of a carrier of silica particles and 50–10% by wt. of a catalytically active part comprising titanium, magnesium, chlorine and alkoxy groups, comprising the following steps:

(a) a solution of magnesium chloride in ethanol is prepared;
    (b) activated silica particles are impregnated with the solution prepared under (a) by suspending the silica particles in the solution;
    (c) at least one titanium compound chosen from alkoxides and halogen alkoxides of titanium and a silicon halide are added to the suspension prepared in (b), with an atomic ratio between the magnesium, in the magnesium chloride, and the titanium ranging from 2.0/1 to 12.1/1 and the ratio between the silicon atoms and alkoxy groups in the alkoxide or halogen alkoxide of titanium ranging from 01./1 to 4.0/1;
    (d) the ethanol is eliminated from the suspension obtained in (c) by evaporation to recover a solid;
    (e) the solid obtained in (d) is reacted with an alkyl aluminum chloride, with an atomic ratio between the chlorine atoms in the alkyl aluminum chloride and the alkoxy groups in the alkoxide or halogen alkoxide of titanium,, ranging from 0.5/1 to 7.0/1; and
    (f) the solid component of the catalyst is recovered.

2. A process according to claim 1, characterized by the fact that an ethanol solution with a concentration of magnesium chloride ranging from 1 to 15% by weight, is prepared in step (a).

3. A process according to claim 1, characterized by the fact that in step (b) a microspheroidal silica is impregnated, having a particle size ranging from 10 to 100 $\mu$m, a $SiO_2$ content of >90% by weight, a surface area ranging from 250 to 400 m²g, volume of the pores ranging from 1.3 to 1.8 ml/g and average diameter of the pores ranging from 20 to 30 $\mu$m, this silica being activated by heating in an inert atmosphere, at a temperature ranging from approximately 100° C. to approximately 650° C., over a period from 1 to 20 hours, or by putting the silica in contact with an organometallic compound selected from the group consisting of magnesium alkyl and an aluminum alkyl, operating at room temperature or at higher temperatures.

4. A process according to claim 3, characterized by the fact that in step (b) from 10 to 20 parts by weight of silica for every 100 parts by volume of the ethanol solution of magnesium chloride are suspended and contact is maintained at a temperature which is brought from 20°-25° C. to approximately 50°-65° C., over a period of from 0.5 to 2.0 hours.

5. A process according to claim 1, characterized by the fact that the titanium compounds used in step (c) are selected from the group consisting of alkoxides and chloroalkoxides of titanium containing from 1 to 4 carbon atoms in the alkoxide portion thereof.

6. A process according to claim 5, characterized by the fact that a mixture of titanium tetrachloride and a titanium tetraalkoxide, is used, with a molar ratio between them of approx. ⅓.

7. A process according to claim 1, characterized by the fact that the silicon halide in stage (c) is selected from the group consisting of silicon tetrahalides and halogen silanes.

8. A process according to claim 1, characterized by the fact that step (c) of the procedure is carried out with an atomic ratio between the magnesium and titanium of from 3.5/1 to 8.5/1 and with a ratio between the silicon atoms and alkoxy groups ranging from 0.5/1 to 2.0/1.

9. A process according to claim 1, characterized by the fact that a compound of zirconium or hafnium selected from the group consisting of zirconium and hafnium halides, alkoxides and halogen alkoxides is added in step (c), in such quantities as to provide an atomic ratio between the titanium and zirconium or hafnium of from 0.5/1 to 2.0/1.

10. A process according to claim 1, characterized by the fact that the operating temperature in step (c) ranges from room temperature to about 100° C., over a period ranging from 0.5 to 3 hours.

11. A process according to claim 1, characterized by the fact that in step (d) of the procedure, the ethanol is eliminated by means of evaporation carried out at either atmospheric pressure or at a reduced pressure and the solid is dried for 0.5 to 2 hours at a temperature of about 120° C., under a pressure of 5-10 mm Hg.

12. A process according to claim 1, characterized by the fact that in stage (e) of the procedure, the solid is reacted with an alkyl aluminium chloride, with an atomic ratio between the chlorine atoms in the alkyl aluminium chloride and the alkoxy groups of the alkoxide or halogen alkoxide of titanium, ranging from 0.5/1 to 7.0/1, operating in an inert hydrocarbon liquid, at a temperature ranging from 10° to 100° C., over a period ranging from 10 minutes to 24 hours.

13. A process according to claim 12, characterized by the fact that the aluminum chloride alkyl is selected from the group consisting of diethyl aluminum chloride, ethyl aluminum sesquichloride, diisobutyl aluminum chloride and isobutyl aluminum dichloride, operating at a temperature ranging from 20° to 90° C., for a period of from 10 minutes to 1 hour.

14. Solid component of catalyst obtained according to the process described in claim 1 with 50 to 90% by weight of silica and from 50-10% by weight of a catalytically active part including titanium, magnesium and chorine, and also alkoxy groups, with the following atomic ratios: Mg/Ti from 2.0/1 to 12.0/1; Cl/Ti from 10/1 to 40/1, alkoxy groups/Ti from 0/1 to 20/1, and with a titanium content ranging from 0.5 to 5.0% by weight, with respect to the weight of the solid component.

15. Solid component of catalyst, according to claim 14, with from 55 to 80% by weight of silica and from 45 to 20% of a catalytically active part, including titanium, magnesium, chlorine and alkoxy groups, with the following atomic ratios: Mg/Ti from 3.5/1 to 8.5/1; Cl/Ti from 12/1 to 36/1, alkoxy groups/Ti from 2/1 to 10/1 and with a titanium content ranging from 0.8 to 2.0% by weight, with respect to the weight of the above solid component.

16. Solid component of catalyst according to claim 14 or 15, with the addition of either zirconium or hafnium, with an atomic ratio between the titanium and zirconium or hafnium ranging from 0.5/1 to 2.0/1.

17. Catalyst for the polymerization of ethylene or for the polymerization of ethylene with alfa-olefins, composed of the solid component of catalyst according to claims 14 or 15 and of an organometallic compound of aluminium chosen from aluminium trialkyls and aluminium alkyl chlorides, containing from 1 to 5, carbon atoms in the alkyl section, with an atomic ratio between the aluminium, in the organometallic compound of aluminium and titanium, in the solid component of catalyst, ranging from 20:1 to 250:1.

18. A process according to claim 3, wherein the silica is activated by putting the silica in contact with an organometallic compound selected from the group consisting of magnesium butyl, butyl octyl magnesium and aluminum triethyl, operating at about 60° C.

19. A process according to claim 5, wherein the alkoxides and chloroalkoxides of titanium are selected from the group consisting of titanium tetra-n-propylate, titanium tetra-n-butylate, titanium tetra-i-propylate, titanium tetra-i-butylate and the corresponding titanium mono- or di-chloroalkoxides.

20. A process according to claim 7, wherein the silicon halide is selected from the group consisting of silicon tetrachloride, trichlorosilane, vinyl trichlorosilane, and chloroethyl trichlorosilane.

21. A process according to claim 9, wherein the compound of zirconium or hafnium is selected from the group consisting of zirconium and hafnium tetrachlorides and chloralkoxides.

22. A process according to claim 10, wherein step (c) is carried out at about 60° C. for a period of about 1 hour.

23. A catalyst according to claim 17, wherein said organometalic compound of aluminum chosen from aluminum trialkyls and aluminum alkyl chlorides contains 2-4 carbon atoms in the alkyl section, with an atomic ratio between the aluminum, in the organometallic compound of aluminum and titanium, in the solid component of catalyst, ranging from 100:1-200:1.

* * * * *